April 6, 1943. A. R. BURNETTE 2,315,768
REFRIGERATING APPARATUS
Filed July 15, 1941 4 Sheets-Sheet 1

INVENTOR

April 6, 1943.　　　A. R. BURNETTE　　　2,315,768
REFRIGERATING APPARATUS
Filed July 15, 1941　　　4 Sheets-Sheet 2

*Algernon R. Burnette*
INVENTOR

April 6, 1943.  A. R. BURNETTE  2,315,768
REFRIGERATING APPARATUS
Filed July 15, 1941   4 Sheets-Sheet 3

INVENTOR

April 6, 1943.　　　A. R. BURNETTE　　　2,315,768
REFRIGERATING APPARATUS
Filed July 15, 1941　　　4 Sheets-Sheet 4

*Algernon R. Burnette*
INVENTOR

Patented Apr. 6, 1943

2,315,768

UNITED STATES PATENT OFFICE 2,315,768

REFRIGERATING APPARATUS

Algernon R. Burnette, New York, N. Y., assignor to John Edward Fox, New York, N. Y.

Application July 15, 1941, Serial No. 402,445

16 Claims. (Cl. 62—114)

This invention relates to refrigerating apparatus and more particularly to apparatus for quick freezing food products.

Refrigerating apparatus used for quick freezing of food products represents a relatively large capital investment. It is therefore important that such apparatus be capable of efficient utilization and that the apparatus be easily and quickly adaptable to quick freezing food products of widely variant sizes and shapes, or packed in containers of various sizes and shapes.

With the apparatus now used, a period of about three hours is needed to quick freeze the average food products. Consequently, the capacity of the apparatus is seriously limited by the time necessary to quick freeze a given charge of food products.

In addition, apparatus heretofore used is not readily and easily adaptable to freezing food products of various sizes and shapes or which have been packed in containers of various sizes and shapes. As a consequence, quick frozen foods are prepared in packages of a limited number of substantially standardized and uniform sizes and shapes.

It will be apparent that a sizable reduction in the freezing time will permit a more efficient utilization of a refrigeration installation by achieving greater output from a given sized installation. Similarly, the efficiency of utilization can be increased by constructing the apparatus so that it is easily adaptable to freezing any type of food product efficiently irrespective of the size or shape of the product or its container. In addition, it is highly desirable to decrease the initial capital investment required for a quick freezing refrigeration unit.

It is therefore among the objects of this invention to provide a simple, inexpensive refrigerating apparatus which is capable of quick freezing food products in a relatively short time; to provide such an apparatus which is easily adaptable to quick freezing food products of various sizes and shapes or which have been packed in containers of various sizes and shapes; to provide such an apparatus comprising freezing leaves or plates alternating with interchangeable distance frames or spacing means whereby the apparatus may be quickly altered in capacity by interchanging such frames or spacing means; to provide such an apparatus in which the constituent elements may be quickly and easily assembled and disassembled; and to provide such an apparatus which is simple to construct, economical of refrigerant, and efficient in operation.

These and other objects of the invention will in part be obvious and in part become apparent from the following description and accompanying drawings, in which.

Generally speaking, the novel apparatus of the invention comprises a horizontal stack or series of alternately arranged freezers or freezing means, such as freezing plates or brine leaves and interchangeable spacers or spacing means such as distance piece frames, each frame being interposed between a pair of freezing plates. Support means are provided to maintain the freezing plates and distance frames in supported horizontal alignment and releasable pressure means are provided to maintain these elements in fluid-tight engagement. The stack of elements preferably is arranged above refrigerant cooling means such as a brine tank provided with direct expansion coils through which is circulated a suitable refrigerant at a controlled sub-freezing temperature. Brine from the tank is withdrawn by suitable means such as a motor driven circulating pump and is forced through a header from which individual, valve-controlled flexible conduits conduct the cold brine to the freezing plates or brine leaves.

The food products to be quick frozen are placed in the spacing means or distance pieces between the freezing plates in either metal or flexible containers which protect the products from direct contact with brine. The size of the distance pieces is chosen with relation to the size and type of food product to be frozen. The freezing plates are hollow, with perforated faces, and the cold brine or other suitable refrigerant, is forced under slight pressure through the perforations into contact with the metal or flexible containers, in which are the food products. The bottoms of the distance pieces may be provided with outlets through which the partially warmed brine returns to the brine tank. Alternatively, the distance pieces may be formed with imperforate bottoms and with outlets at a higher level, whereby the containers with the food products therein may be completely immersed in brine. As will be more fully apparent hereinafter, the apparatus may be quickly adapted for different sized or packaged food products by releasing the pressure means and interchanging the distance frames for frames of a different size.

Figure 1:
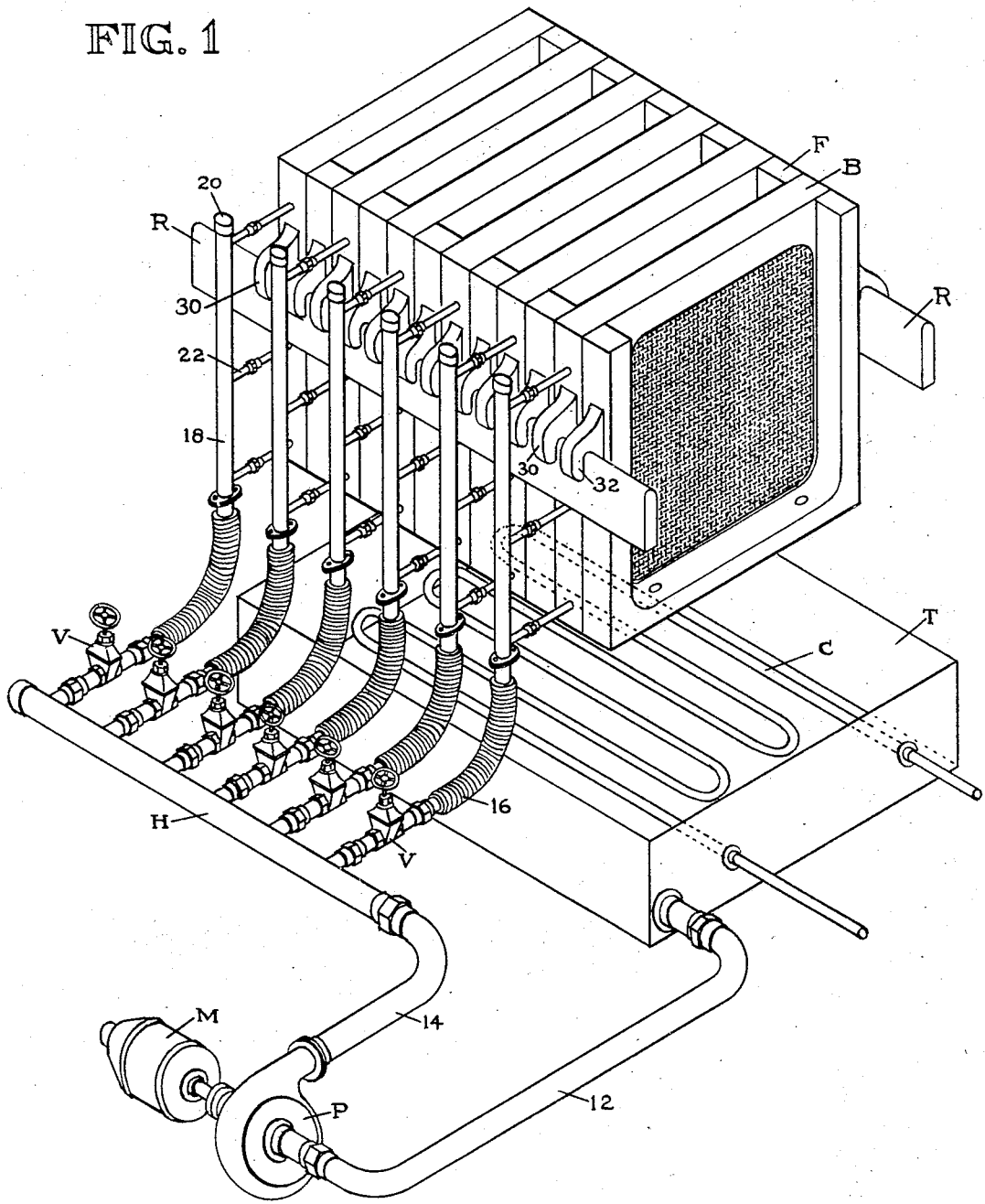
Fig. 1 is a perspective view of one form of apparatus embodying the principles of the invention.
Figure 2:
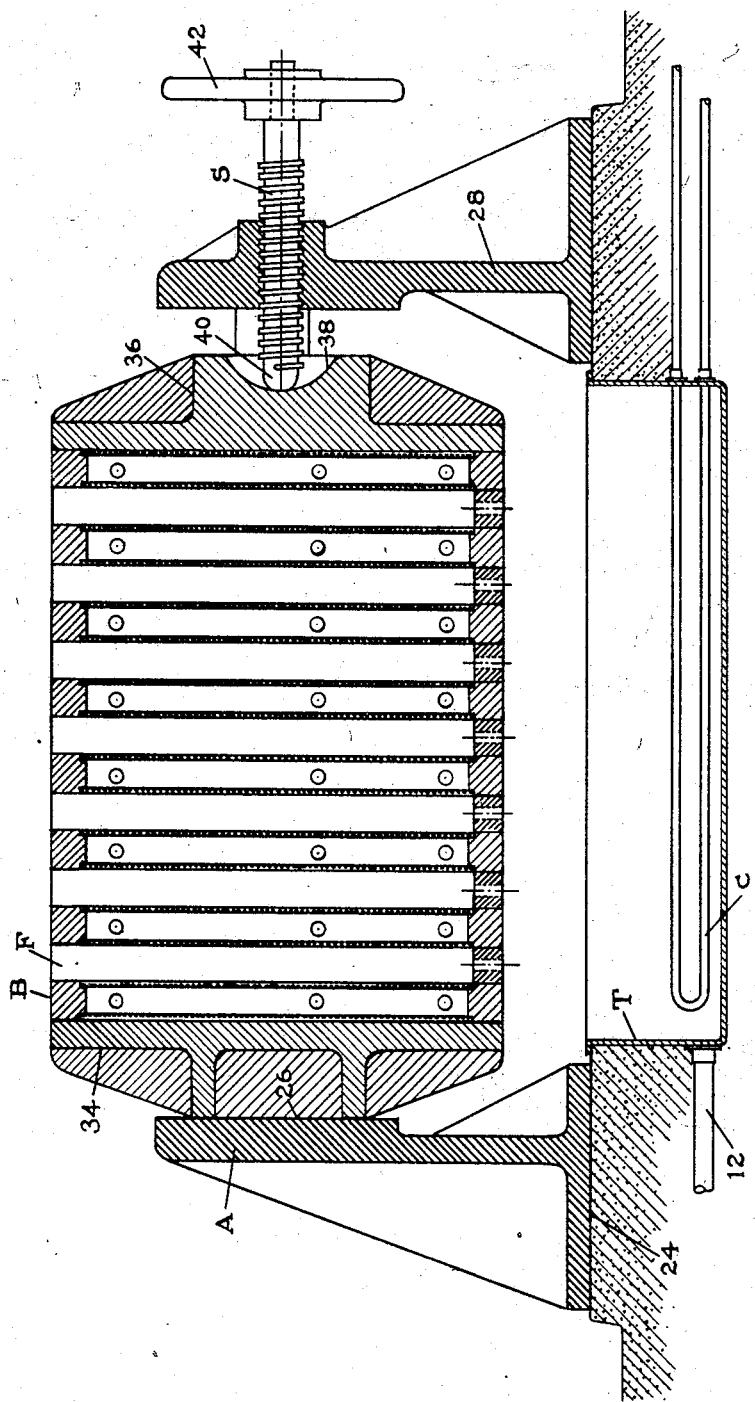
Fig. 2 is a sectional view on a vertical plane extending longitudinally and centrally through a portion of the apparatus shown in Fig. 1.

Referring to the drawings, the apparatus illustrated in complete form in Figs. 1 and 2 comprises a horizontal stack of alternately vertically arranged freezing plates or brine leaves B and spacing means or distance frames F, removably supported on suitable support means such as rails R and held in fluid-tight engagement between a fixed abutment A and releasable pressure means such as a pressure screw S. The horizontal stack of elements preferably is supported over a brine tank T provided with direct expansion coils C through which is circulated a suitable refrigerant at any desired sub-freezing temperature.

Cold brine is withdrawn from tank T through a conduit 12 by a circulating pump P driven by a motor M. From the pump, the brine is circulated through a conduit 14 to a header H. Each brine leaf or freezing plate B is connected to header H by means comprising a valve V, a flexible conduit 16, a riser 18 capped as at 20, and a plurality of branch conduits 22.

Preferably the brine tank T is set below the level of floor 24 or flush therewith. The abutment A, comprising a braced upright having a vertical face 26, is secured to floor 24 adjacent one end of the brine tank and a corresponding braced upright 28 is secured to the floor adjacent the opposite end of the brine tank. The rails R are suitably supported at any desired height above, and extend parallel to the brine tank, and the freezing plates B and distance frames F are slidably supported thereon by means of integral hooks 30 and 32, respectively, for movement longitudinally of the rails.

A pressure plate 34, preferably provided with hooks slidably supported on rails R, engages the face 26 of abutment A. Engaging plate 34 is a brine leaf B on the opposite side of which is a distance frame F. The alternating arrangement of plates B and frames F is continued along the rails R to a point adjacent upright 28. The end of the horizontal stack of elements is constituted by a freezing plate B which is engaged by a second pressure plate 36 having a bearing surface 38 engaged by the rounded inner end 40 of screw S, which is threadedly mounted in upright 28 and provided with an operating handle 42.

Figure 3:
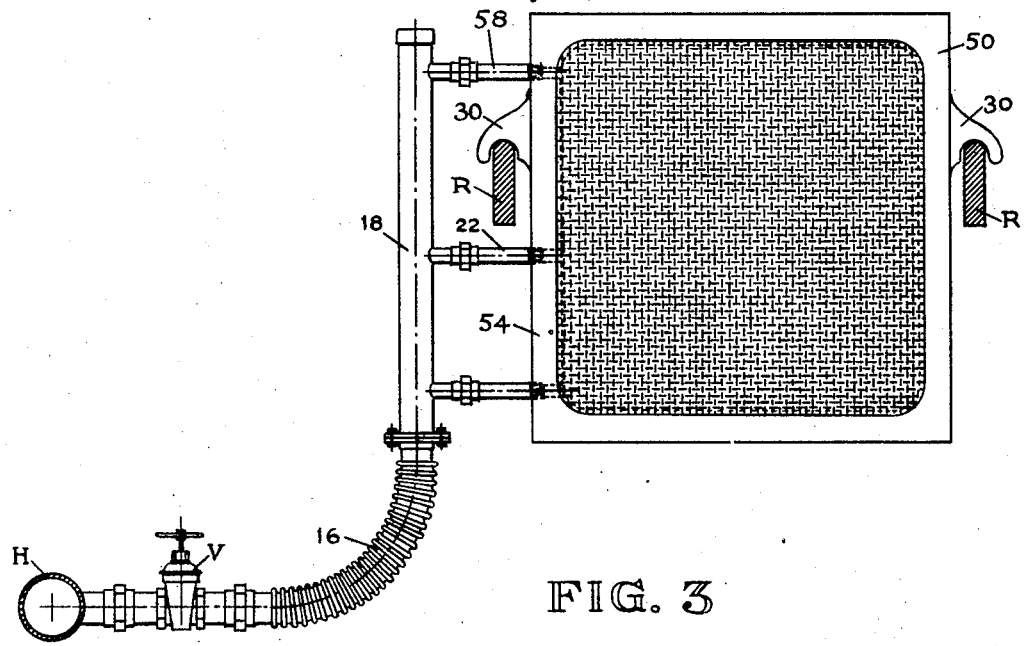
Fig. 3 is an elevational view of a brine leaf or freezing plate forming part of the apparatus shown in Figs. 1 and 2.
Figure 4:
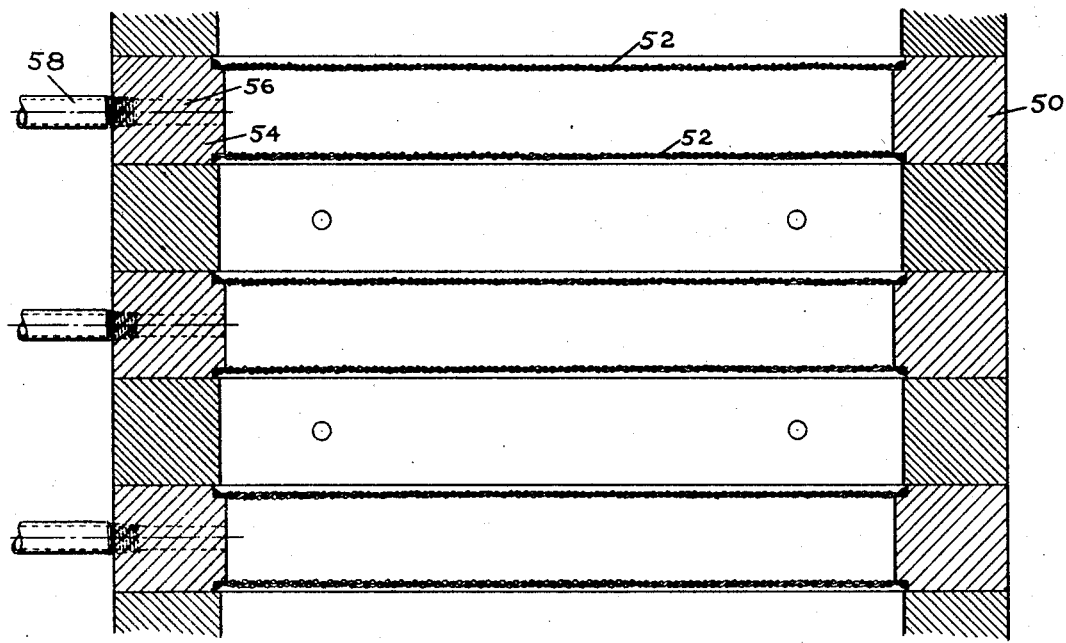
Fig. 4 is a horizontal sectional view through a portion of the apparatus shown in Figs. 1 and 2.
Figure 5:
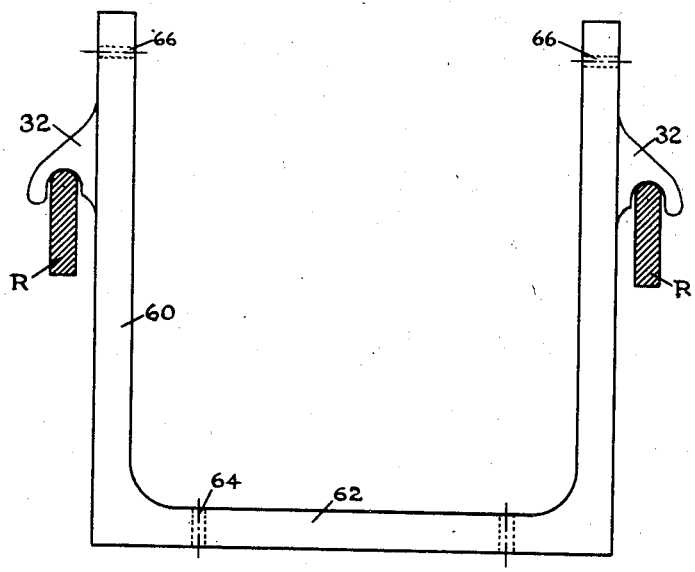
Fig. 5 is an elevational view of an interchangeable distance piece frame or spacer forming part of the apparatus shown in Figs. 1 and 2.
Figures 6, 7:
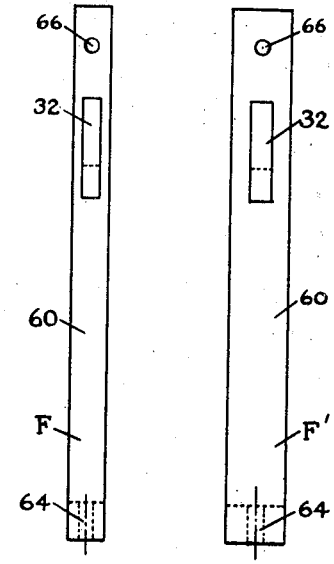
Figs. 6 and 7 are side views of interchangeable frames or spacers as shown in Fig. 5.
Figure 8:
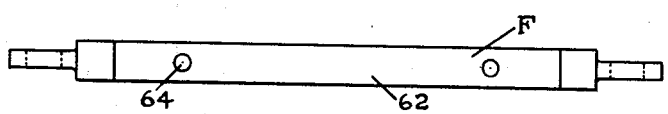
Figs. 8 and 9 are bottom plan views of interchangeable frames or spacers as shown in Fig. 5.
Figure 9:
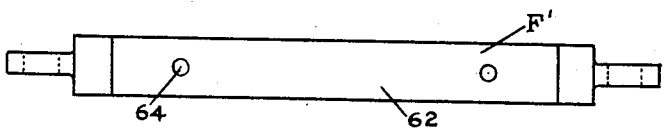

As shown more particularly in Figs. 3 and 4, each brine leaf or freezing plate comprises a substantially rectangular frame 50 to which are secured face members 52, forming an enclosure or box. The face members are formed to direct brine into the frames F, and may be either screen mesh or perforated plates. One side wall 54 of each frame is formed with a plurality of threaded openings 56 in which are secured nipples 58 forming part of branch conduits 22.

Referring more particularly to Figs. 5 through 9, the spacing means or distance piece frames are substantially U-shaped in elevation, comprising side walls 60 and a bottom wall 62. Hooks 32 are formed on side walls 60 to engage the rails R. Preferably, bottom wall 62 is formed with drain openings 64 through which the partially warmed brine may drain into tank T. However, if desired bottom wall 62 may be imperforate and overflow outlets 66 provided near the upper ends of side walls 60. In such event, the food product in its container will be immersed in the brine.

By reference to Figs. 6 through 9, it will be apparent that the distance frames may be of any desired thickness consistent with the size or shape of the product to be frozen or its container. For instance, by loosening screw S, the frame F of Figs. 6 and 8 may be quickly lifted out, frame F' of Figs. 7 and 9 substituted therefor, and screw S re-tightened to render the freezing assembly operative again.

In operation, plates B and frames F are arranged alternately in a horizontal stack on rails R, with a freezing plate at each end of the stack in engagement with one of the pressure plates 34 or 36. The size of the distance frames is selected in accordance with the character of the product to be frozen or its container. Screw S is then tightened to bring the freezing plates into fluid-tight engagement with the distance piece frames.

The food products are inserted in the frames F between plates B and the cold brine is forced by pump P through header H into each plate B, from which it is sprayed at slight pressure on the food products or packages. The partially warmed brine returns to tank T through openings 64 or outlets 66, whichever is provided. The brine is re-cooled by the refrigerant in coils C and re-circulated.

It has been found that food products may be quick frozen with the present apparatus in approximately one-half an hour as compared to an average time of three hours required at present.

In addition, due to the use of the interchangeable distance piece frames, the apparatus is quickly adaptable for freezing various sizes and shapes of food products in their containers, either consecutively or simultaneously; as different sized frames F may be used in the same stack.

The apparatus is simple to construct and to assemble and disassemble, and is efficient in operation as the brine cycle is short, permitting efficient heat absorption. Furthermore, the capacity of the apparatus may be altered at will.

While, to illustrate the principles of the invention, a specific form of apparatus has been shown and described, it will be obvious to those skilled in the art that the invention may be otherwise embodied and the dimensions and interrelation of parts changed without departing from the principles of the invention.

What is claimed is:

1. Refrigerating apparatus comprising, in combination, support means; a series of freezing plates mounted on said support means in spaced relation to each other and adapted to direct refrigerant onto food products to be frozen; and interchangeable spacing means each interposed between a pair of said freezing plates, said spacing means being adapted to contain food products to be frozen and to receive refrigerant from said freezing plates.

2. Refrigerating apparatus comprising, in combination, a support; a series of freezers mounted on said support in spaced relation to each other and adapted to receive fluid refrigerant and to direct such refrigerant onto food products to be frozen; a series of spacers interchangeably mounted on said support and adapted to contain food products to be frozen, each spacer being interposed between a pair of said freezers and being adapted to contain food products to be frozen and to receive fluid refrigerant from said freezers; and means maintaining said freezers and spacers in fluid-tight engagement.

3. Refrigerating apparatus as claimed in claim 2, in which said freezers comprise enclosures having face members adjacent said spacers, said face members being formed to direct refrigerant into said spacers.

4. Refrigerating apparatus as claimed in claim 2, in which said spacers comprise distance piece frames substantially U-shaped in elevation.

5. Refrigerating apparatus as claimed in claim 2, in which said support comprises a pair of horizontally extending, parallel rails; said freezers and said spacers being formed with means movably engaging said rails.

6. Refrigerating apparatus as claimed in claim 2, in which said last-named means comprises a pair of pressure plates, each mounted on said support means and engaging one end of said series of freezers; a fixed abutment engaging one of said pressure plates; and releasable pressure means engaging the other of said pressure plates.

7. Refrigerating apparatus comprising, in combination, a series of alternately arranged freezing means and interchangeable spacing means, said spacing means being adapted to receive and contain food products to be frozen; refrigerant cooling means; means for withdrawing cold refrigerant from said cooling means and supplying it to said freezing means; said freezing means being formed to direct refrigerant into said spacing means; and means to return partially warmed refrigerant from said spacing means to said cooling means.

8. Refrigerating apparatus comprising, in combination, a series of spaced freezing plates; a series of interchangeable frames, each adapted to be removably interposed between a pair of said freezing plates and to contain food products; and means to supply refrigerant to said freezing plates, said plates being adapted to direct said refrigerant into said frames and upon the food products contained therein; said frames being quickly interchangeable whereby said apparatus is readily adaptable to freezing food products of different sizes and shapes.

9. Refrigerating apparatus comprising, in combination, a brine tank; a pair of parallel rails mounted above said brine tank; a series of spaced freezing plates movably mounted on said rails; a series of interchangeable frames movably mounted on said rails, each frame being interposed between a pair of said plates and adapted to contain food products to be frozen; releasable means urging said plates and frames into fluid-tight engagement; means for supplying cold brine from said tank to said freezing plates, said freezing plates being adapted to direct said brine into said frames; and means for returning partially warmed brine to said tank.

10. Refrigerating apparatus comprising, in combination, a brine tank; a pair of spaced parallel rails mounted above said brine tank; a series of spaced freezing plates slidably supported on said rails; a series of spaced distance piece frames slidably supported on said rails and each interposed between a pair of freezing plates and adapted to contain food products to be frozen; means in said brine tank for cooling brine therein; a pump connected to said brine tank; a header connected to said pump; and flexible conduits connecting said header to each of said freezing plates; said freezing plates being adapted to direct cold brine into said frames and said frames being formed to return partially warmed brine to said tank.

11. For use in quick-freezing apparatus, a freezing plate comprising, in combination, a substantially rectangular frame; face members secured to said frame to form therewith an enclosure; and conduit means secured in a side wall of said frame to supply refrigerant to said enclosure; said face members being formed to direct refrigerant from said enclosure.

12. A freezing plate as claimed in claim 11, in which said face members comprise perforated plates.

13. A freezing plate as claimed in claim 11, in which said face members comprise screen mesh.

14. For use in quick-freezing apparatus, a distance piece frame substantially U-shaped in elevation, said frame being adapted to contain food products to be frozen and comprising a bottom wall and a pair of side walls, said side walls being formed with hooks adapted to movably engage a support.

15. A distance piece frame as claimed in claim 14, in which said bottom wall is formed with a drain opening.

16. A distance piece frame as claimed in claim 14, in which at least one of said side walls is formed with a drain opening at a substantial distance above said bottom wall.

ALGERNON R. BURNETTE.